UNITED STATES PATENT OFFICE.

GEORGE AUGUST ENGELHARD, OF NEW YORK, N. Y., AND RUDOLPH F. H. HAVEMANN, OF NEW BRUNSWICK, NEW JERSEY.

IMPROVEMENT IN COMPOUNDS OF CAOUTCHOUC AND ALLIED GUMS.

Specification forming part of Letters Patent No. 26,175, dated November 22, 1859.

*To all whom it may concern:*

Be it known that we, GEORGE AUGUST ENGELHARD, of the city, county, and State of New York, and RUDOLPH FRANZ HEINRICH HAVEMANN, of New Brunswick, in the county of Middlesex and State of New Jersey, have invented a new and Improved Mode of Treating Gum—such as India-Rubber or Gutta-Percha—for the Manufacture of Various Articles; and we do hereby declare that the following is a full, clear, and exact description of the same.

It is generally assumed that chlorine has no action on such gums as india-rubber or gutta-percha, except a bleaching action, and, indeed, if such gums are in a solid state the effect of the chlorine on the same is so slow that it takes weeks to produce a perceptible change on the surface of said gum. Solid lumps of gutta-percha or india-rubber may, however, be subjected to the influence of chlorine by inclosing the same in an air-tight vessel where they are exposed to a stream of chlorine, which is renewed whenever that portion of the same which has been in contact with the rubber is absorbed. The gum begins to swell, and it turns into a white brittle mass, which is well washed in water in order to clean it from the adherent chlorine, and after this it is dissolved in one of the well-known solvents of those gums—such as bisulphuret of carbon, benzole, chloroform, &c.—and from this solution the composition is precipitated by evaporating in an open vessel, and our new product appears on the bottom in a plate of more or less thickness, and after drying it becomes perfectly white and hard, like ivory. In order to produce this change quicker, we dissolve the gum in one of the well-known solvents—such as bisulphuret of carbon, benzole, chloroform, &c.—and this solution is brought in contact with the clorine by passing a stream of gaseous chlorine into the same in order to bring said chlorine in immediate contact with the gum contained in said solution. The solution, which is of a dark color when first made, turns brighter as the chlorine begins to take effect, and after a certain time it becomes yellow, when the combination of the gum with the chlorine is perfected. The solvent is now removed by evaporation at a moderate temperature, not sufficiently high to reach the boiling-point of said solvent; or it may be done by treating the mixture with alcohol, which combines with the solvent and causes the gum combined with the chlorine to precipitate. After removing the liquid, by filtering or evaporation, the composition of gum and chlorine is well washed with alcohol, and then it is pressed and dried, when it forms the same white and hard mass which has been mentioned above.

This composition of the above-mentioned gums is soluble in all the usual solvents of said gums; hot water or acids have no influence on the same, and on account of its white color and for the sake of its hardness it can be used for manufacturing various articles.

What we claim as our invention, and desire to secure by Letters Patent, is—

The within-described product obtained by the action of chlorine on gums—such as india-rubber or gutta-percha—whether in solution or in substance, in either of the modes above pointed out, or in any other that is substantially the same and which will produce a like effect.

Dated at New York city, May 30, 1859.

GEORGE AUGUST ENGELHARD.
RUDOLPH FRANZ HEINRICH HAVEMANN.

In presence of—
GUSTAV MILLER,
PAUL MILLER.